US012261406B2

(12) United States Patent
Paul et al.

(10) Patent No.: US 12,261,406 B2
(45) Date of Patent: Mar. 25, 2025

(54) SPECTRAL BEAM COMBINER SUPPORTING EMBEDDED AUTO-ALIGNMENT SCHEME

(71) Applicant: Raytheon Company, Waltham, MA (US)

(72) Inventors: Justin R. Paul, Melissa, TX (US); David R. McCormick, Celina, TX (US); Justin O. Compton, Plano, TX (US)

(73) Assignee: Raytheon Company, Arlington, VA (US)

( * ) Notice: Subject to any disclaimer, the term of this patent is extended or adjusted under 35 U.S.C. 154(b) by 1112 days.

(21) Appl. No.: 16/688,535

(22) Filed: Nov. 19, 2019

(65) Prior Publication Data

US 2021/0151948 A1 May 20, 2021

(51) Int. Cl.
*H01S 3/086* (2006.01)
*H01S 3/00* (2006.01)
(Continued)

(52) U.S. Cl.
CPC ............ *H01S 3/086* (2013.01); *H01S 3/0014* (2013.01); *H01S 3/02* (2013.01); *H01S 3/139* (2013.01)

(58) Field of Classification Search
CPC .......... H01S 3/086; H01S 3/0014; H01S 3/02; H01S 3/139; H01S 3/1305; H01S 3/2391;
(Continued)

(56) References Cited

U.S. PATENT DOCUMENTS

| 4,140,398 A | * | 2/1979 | Hodder | ................ G01B 11/272 356/139.05 |
| 5,604,592 A | * | 2/1997 | Kotidis | .............. G01N 29/2456 374/119 |

(Continued)

FOREIGN PATENT DOCUMENTS

KR 10-1611342 B1 4/2016

OTHER PUBLICATIONS

International Search Report and Written Opinion of the International Searching Authority in connection with International Patent Application No. PCT/US2020/034749 dated Aug. 14, 2020, 13 pages.

*Primary Examiner* — Xinning(Tom) Niu

(57) ABSTRACT

An apparatus includes an auto-alignment laser configured to generate an auto-alignment laser beam. The apparatus also includes a spectral beam combiner having a diffraction grating. The diffraction grating is configured to diffract multiple input laser beams to produce a combined beam having a higher power or energy compared to the individual input laser beams. The diffraction grating is also configured to diffract the auto-alignment laser beam so that a portion of the auto-alignment laser beam co-propagates in a common direction with the combined beam. Wavelengths of the input laser beams and the auto-alignment laser beam may be selected such that portions of the input laser beams and the portion of the auto-alignment laser beam diffract from the diffraction grating in the common direction. The portion of the auto-alignment laser beam that co-propagates with the combined beam may include a higher-order diffraction of the auto-alignment laser beam from the diffraction grating.

20 Claims, 4 Drawing Sheets

(51) Int. Cl.
*H01S 3/02* (2006.01)
*H01S 3/139* (2006.01)

(58) Field of Classification Search
CPC ..... H01S 3/0071; H01S 3/005; G02B 5/1814; G02B 27/1086; F41H 13/0062
See application file for complete search history.

(56) References Cited

U.S. PATENT DOCUMENTS

| | | |
|---|---|---|
| 6,606,339 B1 | 8/2003 | Greninger |
| 6,792,028 B2 | 9/2004 | Cook et al. |
| 7,041,953 B2 | 5/2006 | Byren |
| 7,199,924 B1 * | 4/2007 | Brown .................. H01S 3/2383 398/87 |
| 7,535,631 B2 | 5/2009 | Brown et al. |
| 7,952,691 B2 | 5/2011 | Mosier et al. |
| 10,177,526 B1 | 1/2019 | Bochove |
| 2003/0035447 A1 * | 2/2003 | Scheps ................ H04N 9/3129 348/E9.026 |
| 2006/0039433 A1 * | 2/2006 | Simpson ............. H01S 3/0635 372/50.1 |
| 2007/0127123 A1 * | 6/2007 | Brown ................. G02B 27/144 359/556 |
| 2015/0234195 A1 * | 8/2015 | Honea ................ G02B 27/0905 359/618 |

* cited by examiner

SPECTRAL BEAM COMBINER SUPPORTING EMBEDDED AUTO-ALIGNMENT SCHEME

TECHNICAL FIELD

This disclosure is generally directed to laser systems. More specifically, this disclosure is directed to a spectral beam combiner supporting an embedded auto-alignment scheme.

BACKGROUND

Various types of laser systems are being developed for a number of commercial and defense-related applications. For example, high-energy lasers may be used to direct high-energy laser (HEL) beams at incoming missiles, rockets, mortars, or other targets. Unfortunately, various factors can degrade an HEL beam, which reduces the focused power of the HEL beam on a desired target. This can increase the amount of time needed to achieve a desired result, such as damage or destruction of the target, or can prevent the desired result from being achieved.

SUMMARY

This disclosure relates to a spectral beam combiner supporting an embedded auto-alignment scheme.

In a first embodiment, an apparatus includes an auto-alignment laser configured to generate an auto-alignment laser beam. The apparatus also includes a spectral beam combiner having a diffraction grating. The diffraction grating is configured to diffract multiple input laser beams to produce a combined beam having a higher power or energy compared to the individual input laser beams. The diffraction grating is also configured to diffract the auto-alignment laser beam so that a portion of the auto-alignment laser beam co-propagates in a common direction with the combined beam.

In a second embodiment, a laser system includes an auto-alignment laser configured to generate an auto-alignment laser beam. The laser system also includes a spectral beam combiner having a diffraction grating that is configured to (i) diffract multiple input laser beams to produce a high-energy laser (HEL) beam having a higher power or energy compared to the individual input laser beams and (ii) diffract the auto-alignment laser beam so that a portion of the auto-alignment laser beam co-propagates in a common direction with the HEL beam. The laser system further includes a sensor configured to sense at least part of the portion of the auto-alignment laser beam that co-propagates with the HEL beam. In addition, the laser system includes a controller configured to control at least part of the laser system based on measurements from the sensor.

In a third embodiment, a method includes generating an auto-alignment laser beam. The method also includes diffracting multiple input laser beams using a diffraction grating to produce a combined beam having a higher power or energy compared to the individual input laser beams. The method further includes diffracting the auto-alignment laser beam using the diffraction grating so that a portion of the auto-alignment laser beam co-propagates in a common direction with the combined beam.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
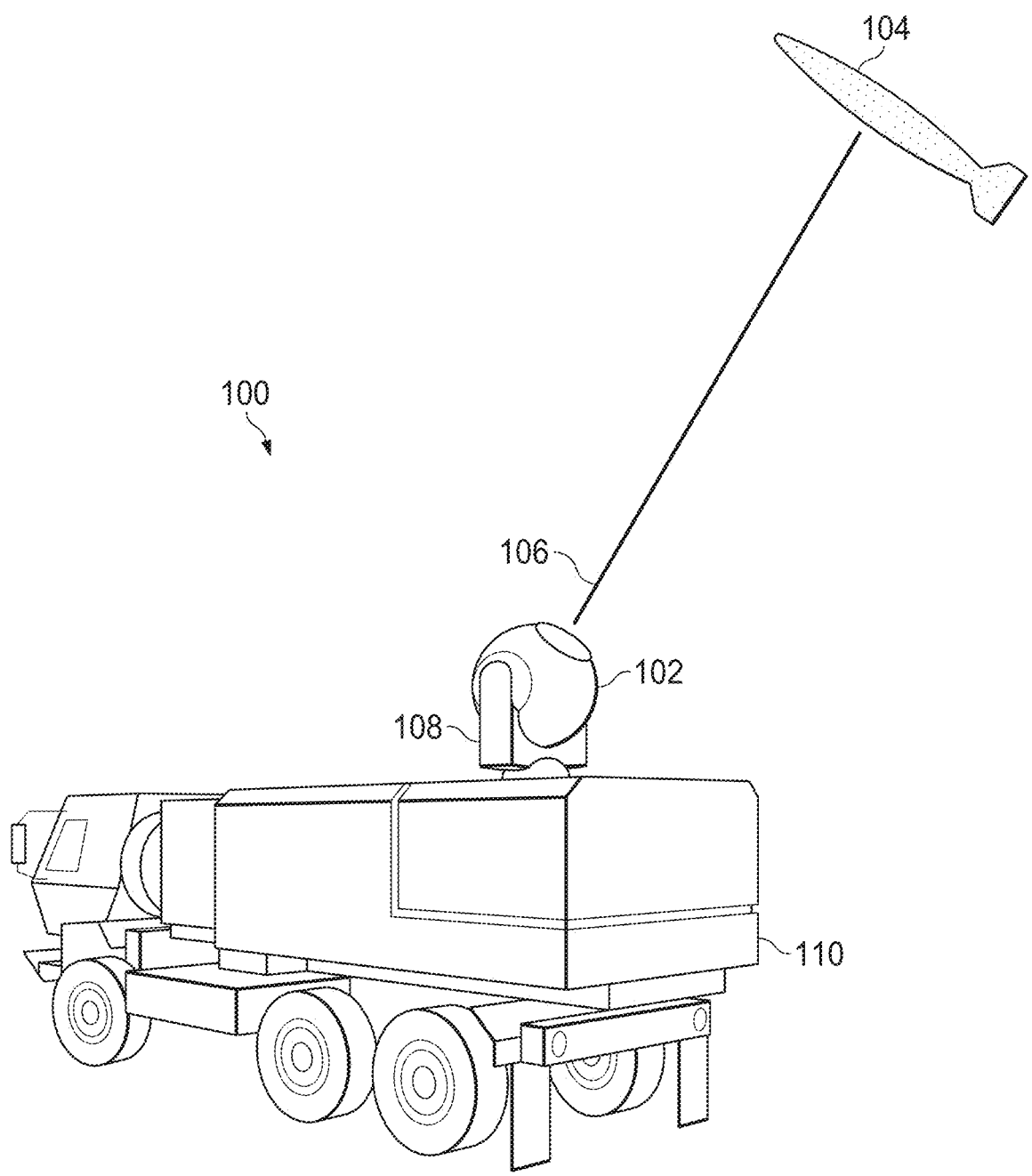
FIG. 1 illustrates an example system that includes a spectral beam combiner supporting an embedded auto-alignment scheme according to this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For simplicity and clarity, some features and components are not explicitly shown in every figure, including those illustrated in connection with other figures. It will be understood that any features illustrated in the figures may be employed in any of the embodiments described. Omission of a feature or component from a particular figure is for purposes of simplicity and clarity and is not meant to imply that the feature or component cannot be employed in the embodiments described in connection with that figure.

As noted above, various laser systems are being developed for a number of commercial and defense-related applications, such as to direct high-energy laser (HEL) beams at incoming missiles, rockets, mortars, or other targets. Unfortunately, various factors can degrade an HEL beam or other laser beam or interfere with its use. For example, jitter refers to movement of an HEL beam or other laser beam on a target, which can prevent the beam from remaining at the same location on the target. This typically increases the amount of time needed for the beam to achieve a desired result, such as damaging or destroying the target, or it can prevent the desired result from being achieved altogether.

To help overcome these or other problems, an auto-alignment beam that is co-boresighted to an HEL beam can be generated, which means that the auto-alignment beam is (ideally) aimed at the same point as the HEL beam. As a result, the auto-alignment beam can be used to aim the HEL beam at a target before the HEL beam is actually generated and directed towards the target. This may be referred to as low-power aiming of the HEL beam. Also, the auto-alignment beam can be used to sense jitter or other movement of the auto-alignment beam, and corrections can be made to one or more optical devices to substantially cancel the movement of the auto-alignment beam. Since the auto-alignment beam is co-boresighted to the HEL beam, this (ideally) also substantially cancels the movement of the HEL beam on a target. The wavelength of the auto-alignment beam can be selected to be far out-of-band relative to the HEL beam, which helps to split the auto-alignment beam from the HEL beam for detection of the auto-alignment beam.

Unfortunately, in certain systems, an auto-alignment beam is generated downstream from an HEL beam, which means that the HEL beam and the auto-alignment beam are generated separately and then optically combined onto a common optical path. In these or other types of systems, the auto-alignment beam cannot follow part of an optical path that is followed by the HEL beam, and one or more optical elements in the optical path of the HEL beam (prior to optical combination with the auto-alignment beam) are not sampled using the auto-alignment beam. Because of this, boresight shifts due to motion of the HEL beam relative to the auto-alignment beam can occur, so the HEL beam can move in a way that the auto-alignment beam does not. This results in the creation of boresight errors or pointing errors that cause the aimpoint of the auto-alignment beam to diverge from the aimpoint of the HEL beam. These boresight errors can be caused by various factors, such as thermally-induced motion or structurally-induced motion of the optical element or elements that are not sampled using the auto-alignment beam. These boresight errors can result in relative jitter between the auto-alignment beam and the HEL beam and jitter of the HEL beam on the target, which reduces the effective power of the HEL beam on a target.

In accordance with this disclosure, an auto-alignment laser that generates an auto-alignment beam is embedded into or otherwise used in conjunction with an array or other collection of lasers that generate multiple input laser beams. The input laser beams and the auto-alignment beam are provided to a diffraction grating. The wavelengths of the input laser beams and the angles of the input laser beams on the diffraction grating are selected so that the diffraction grating combines the input laser beams to produce an HEL beam or other combined laser beam having a higher power or energy (relative to the multiple input laser beams individually). Moreover, the wavelength of the auto-alignment beam and the angle of the auto-alignment beam on the diffraction grating are selected so that the diffraction grating causes a diffraction (such as a second-order or other higher-order diffraction) of the auto-alignment beam to be co-boresighted to the HEL beam or other combined laser beam. Because of this, the auto-alignment beam can follow the same optical path as the HEL beam or other combined laser beam through a laser system, at least up to the point where the auto-alignment beam is split from the combined laser beam and processed. To support this, the wavelength of the auto-alignment beam is selected so that the second-order or other higher-order diffraction of the auto-alignment beam co-propagates with the combined beam.

In this way, the auto-alignment beam can share more of the optical path of an HEL beam or other combined laser beam through a laser system. This reduces or eliminates the presence of optical elements in the laser system that are not sampled using the auto-alignment beam. Because of this, motion of the HEL beam or other combined beam relative to the auto-alignment beam can be reduced or minimized, which reduces or minimizes boresight errors. As a result, the aimpoint of the combined beam can more effectively track the aimpoint of the auto-alignment beam, even in the presence of thermally-induced motion or structurally-induced motion of one or more optical elements in the laser system. This enables more effective aiming of the combined beam at a target with improved fidelity and improved tracking and jitter correction. Overall, this can result in reduced or minimal movement of the combined beam on a target, increasing the effective power of the combined beam on the target.

FIG. 1 illustrates an example system 100 that includes a spectral beam combiner supporting an embedded auto-alignment scheme according to this disclosure. As shown in FIG. 1, the system 100 includes a high-energy laser system 102 that is being used to engage a target 104. The target 104 in this example represents a rocket or missile. However, the high-energy laser system 102 may be used with any other suitable targets, such as one or more targets on the ground, in the air, or in space. Also, a spectral beam combiner supporting an embedded auto-alignment scheme may be used in any other suitable laser system for any other suitable purpose and is not limited to use with high-energy laser systems that engage hostile targets.

The laser system 102 in this example generates an HEL beam 106. The HEL beam 106 represents a beam of laser energy that typically has a high power or energy level, such as at least about 10 kilo-Watts (kW) of power. Often times, the HEL beam 106 is ideally focused to as small an area as possible on the target 104, which is done in order to achieve the maximum possible effect on the target 104. However, because of this, the HEL beam 106 is particularly susceptible to jitter or other non-consistent placement of the HEL beam 106 on the target 104.

As described in more detail below, the laser system 102 includes a spectral beam combiner having an auto-alignment laser embedded or otherwise used in conjunction with an array or other collection of other lasers. The auto-alignment laser is configured to generate an auto-alignment beam, and the collection of other lasers is configured to generate multiple input laser beams. A diffraction grating combines the input laser beams to produce the HEL beam 106, and the diffraction grating causes a portion of the auto-alignment beam to co-propagate with the HEL beam 106 within the laser system 102. Thus, the auto-alignment beam follows the same optical path as the HEL beam 106, at least until split from the HEL beam 106 for sensing. This reduces or minimizes motion of the HEL beam 106 relative to the auto-alignment beam within the laser system 102 and therefore reduces or minimizes boresight errors.

In this particular example, the laser system 102 includes or is used with a multi-axis gimbal 108, which mounts the laser system 102 on a vehicle 110. The multi-axis gimbal 108 includes any suitable structure configured to point the laser system 102 in a desired direction. In some embodiments, the multi-axis gimbal 108 can rotate the laser system 102 about a vertical axis for azimuth control and about a horizontal axis for elevation control. However, any other suitable mechanisms for pointing the laser system 102 (such as about a single axis or multiple axes) may be used here. Also, in this particular example, the vehicle 110 on which the laser system 102 is mounted represents an armored land vehicle. However, the laser system 102 may be used with any other suitable type of vehicle (such as any other suitable land, air, or space vehicle), or the laser system 102 may be mounted to a fixed structure (such as a building).

Among other things, the functionality implemented within the laser system 102 that is described in this patent document helps to reduce or minimize beam jitter or other movement of the HEL beam 106 on the target 104. The ability to maintain the HEL beam 106 at substantially the same position on the target 104 can help increase the effectiveness of the laser system 102. For example, reduced or minimal movement of the HEL beam 106 on the target 104 can help to increase the effective power of the HEL beam 106 on the target 104. A reduction of even a few microradians of jitter on the target 104 can make a large difference in the effectiveness of the HEL beam 106 on the target 104. As a particular example, if an HEL beam 106 normally experiences about 4.4 microradians of jitter on the target 104 without the functionality described in this patent document, reducing the jitter to effectively zero with the functionality described in this patent document may double the effectiveness of the HEL beam 106 on the target 104.

Although FIG. 1 illustrates one example of a system 100 that includes a spectral beam combiner supporting an embedded auto-alignment scheme, various changes may be made to FIG. 1. For example, the laser system 102 may be used in any other suitable environment and for any other suitable purpose. Also, while the use of an auto-alignment beam co-propagating with an HEL beam 106 is described here, the same or similar functionality can be used to allow an auto-alignment beam to co-propagate with any other suitable laser beam (whether or not that other beam is technically considered a "high-power" beam). In addition, while shown here as being used to damage or destroy a moving hostile target 104, the laser system 102 can be used in any number of other ways depending on the application.

As noted above, there are various commercial and other non-defense-related applications for high-energy laser systems that may benefit from the approaches described in this patent document. For instance, in commercial mining applications like drilling, mining, or coring operations, a high-energy laser can be used to soften or weaken an earth bed prior to drilling, which may allow for fewer drill bit changes and extended lifetimes and reliabilities of drill bits. In remote laser welding, cutting, drilling, or heat treating operations like industrial or other automation settings, a high-energy laser can be used to allow for the processing of thicker materials at larger working distances from the laser system while minimizing the heat-affected zone and maintaining vertical or other cut lines. This helps to support welding or cutting operations where proximity to the weld or cut site is difficult or hazardous and helps to protect the laser system and possibly any human operators from smoke, debris, or other harmful materials. In construction and demolition operations like metal resurfacing or deslagging, paint removal, and industrial demolition operations, a high-energy laser can be used to ablate material much faster and safer compared to conventional operations. As a particular example of this functionality, a high-energy laser can be used to support demolition of nuclear reactors or other hazardous structures, such as by cutting through contaminated structures like contaminated concrete or nuclear containment vessels or reactors from long distances. This avoids the use of water jet cutting or other techniques (which creates contaminated water or other hazardous waste) and provides improved safety (since human operators can remain farther away from contaminated structures being demolished). A number of additional applications are possible, such as with a high-energy laser in power beaming applications (where a beam is targeted to photovoltaic cells of remote devices to be recharged) or hazardous material applications (where a beam is used to heat and decompose hazardous materials into less harmful or non-harmful materials).

Figure 2:
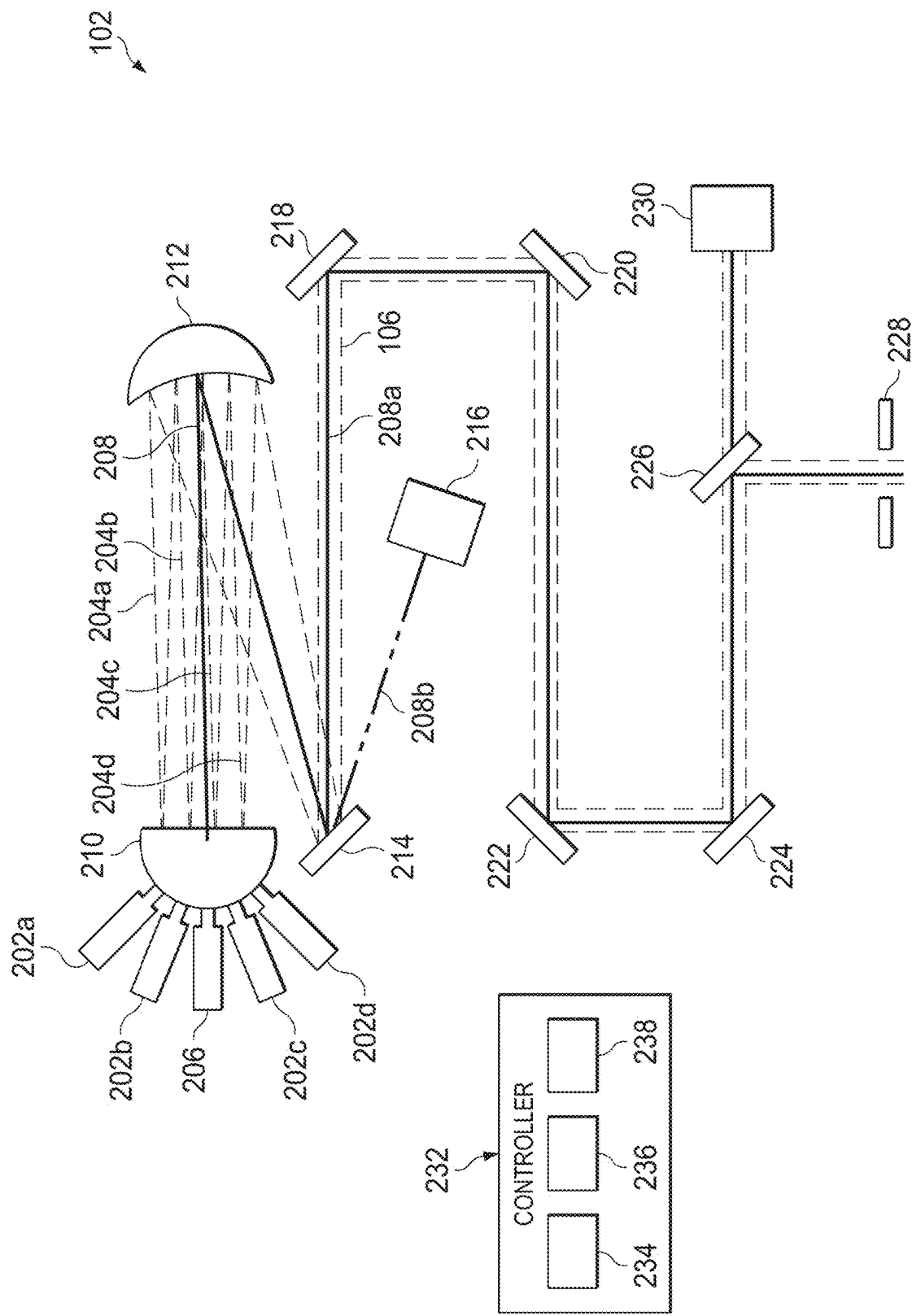
FIG. 2 illustrates a portion of an example high-energy laser system that includes a spectral beam combiner supporting an embedded auto-alignment scheme according to this disclosure.

FIG. 2 illustrates a portion of an example high-energy laser system 102 that includes a spectral beam combiner supporting an embedded auto-alignment scheme according to this disclosure. For ease of explanation, the high-energy laser system 102 shown in FIG. 2 may be described as being used in the system 100 of FIG. 1 to engage a hostile target 104. However, the high-energy laser system 102 of FIG. 2 may be used in any other suitable environment and for any other suitable purpose.

As shown in FIG. 2, the high-energy laser system 102 includes various components that are used to generate the HEL beam 106. In this example embodiment, the high-energy laser system 102 includes multiple input lasers 202a-202d, which generally operate to produce different input laser beams 204a-204d. Each input laser beam 204a-204d represents a beam of optical energy, and the input laser beams 204a-204d are combined as described below to produce the HEL beam 106 (or some other combined beam). Also as described below, each input laser beam 204a-204d may have a slightly different wavelength in order to facilitate combination of the input laser beams 204a-204d to produce the HEL beam 106. In some embodiments, the input laser beams 204a-204d may have wavelengths around a nominal value of about 1050 nm, although other wavelengths may be used.

Each input laser 202a-202d represents any suitable structure configured to generate a beam of laser energy. In some embodiments, each input laser 202a-202d includes a planar waveguide (PWG) amplifier or other optical amplifier, which amplifies a seed laser beam using pump power provided to the optical amplifier by one or more pump sources (such as one or more laser diode arrays) to produce a corresponding input laser beam 204a-204d. However, any other suitable laser may be used here for each input laser 202a-202d. Also, each of the input laser beams 204a-204d may have any suitable power or energy level, such as at least about 2.5 kW of power. Note that while four input lasers 202a-202d are shown here as producing four input laser beams 204a-204d, the laser system 102 may include any suitable number of input lasers that produce any suitable number of input laser beams. The number of input lasers 202a-202d may vary based on, for instance, the desired power or energy level of the HEL beam 106.

The high-energy laser system 102 also includes an auto-alignment laser 206, which generally operates to produce an auto-alignment laser beam 208. The auto-alignment laser beam 208 represents a beam of optical energy, which is lower (and typically much lower) in power or energy compared to the input laser beams 204a-204d. The auto-alignment laser beam 208 is used as described below to help aim the HEL beam 106 and to sense jitter or other movement that affects the auto-alignment laser beam 208 and therefore the HEL beam 106. The auto-alignment laser 206 represents any suitable structure configured to generate a beam of laser energy. In some embodiments, the auto-alignment laser 206 represents a laser operating around about 525 nm. However, any other suitable laser may be used here as the auto-alignment laser 206.

The various optical beams 204a-204d, 208 from the input lasers 202a-202d and the auto-alignment laser 206 are provided to a fiber launcher 210. The input lasers 202a-202d and the auto-alignment laser 206 may be coupled to the fiber launcher 210 in any suitable manner, such as via one or more optical fibers. The distance between the lasers 202a-202d, 206 and the fiber launcher 210 can vary as needed or desired, although in some implementations the distance may be kept as small as possible. Also, depending on the implementation, the auto-alignment laser 206 may be embedded with the input lasers 202a-202d in the same structure, or the auto-alignment laser 206 may be implemented separate from the input lasers 202a-202d. In some embodiments, the lasers 202a-202d, 206 may be formed as an array of lasers in an integrated structure, and the auto-alignment laser 206 can be embedded with the input lasers 202a-202d in the array.

The fiber launcher 210 receives the input beams 204a-204d and the auto-alignment beam 208 and launches or provides the beams 204a-204d, 208 to a transform optic 212. For example, the fiber launcher 210 can receive the beams 204a-204d, 208 and output the beams in specific directions towards the transform optic 212 through free space. The fiber launcher 210 includes any suitable structure configured to output multiple optical beams in a desired manner.

The transform optic 212 operates to receive the launched beams 204a-204d, 208 from the fiber launcher 210 and to transform the beams 204a-204d, 208. In this example, the transform optic 212 is configured to focus the beams 204a-204d, 208 onto a diffraction grating 214. This can be accomplished using a concave reflective surface of the transform optic 212. The transform optic 212 includes any suitable reflective structure or other optical device(s) configured to focus or otherwise provide the beams 204a-204d, 208 to the diffraction grating 214 in a specified manner.

The diffraction grating 214 generally represents an optical device that has a periodic structure. The periodic structure of the diffraction grating 214 causes optical energy in each of the beams 204a-204d, 208 to split or diffract and travel in different directions from the diffraction grating 214. Diffraction gratings can be reflective or transmissive, and the diffraction grating 214 in this example is reflective (although a transmissive diffraction grating may also be used depending on the implementation). As described in more detail below, the splitting or diffracting of each beam 204a-204d, 208 is dependent (at least in part) on the wavelength of the optical energy in the beam 204a-204d, 208 and the direction at which the beam 204a-204d, 208 reaches the diffraction grating 214. This feature of the diffraction grating 214 is used to combine the input laser beams 204a-204d to produce the HEL beam 106. This feature of the diffraction grating 214 is also used to make a diffraction (such as a second-order or other higher-order diffraction) of the auto-alignment beam 208 co-propagate with the HEL beam 106, which essentially causes the auto-alignment beam 208 to be co-boresighted to the HEL beam 106.

Since the diffracting of each beam 204a-204d, 208 varies based on the wavelength of the optical energy in the beam 204a-204d, 208 and the direction that the beam 204a-204d, 208 reaches the diffraction grating 214, this feature can be used to select or control how the beams 204a-204d, 208 are processed prior to reaching the diffraction grating 214. Here, the input laser beams 204a-204d are being combined to produce the HEL beam 106. As a result, the wavelength and direction of each input laser beam 204a-204d are selected or controlled so that most optical energy from all of the input laser beams 204a-204d diffracts from the diffraction grating 214 in the same direction. Because the input laser beams 204a-204d here arrive at the diffraction grating 214 from slightly different directions, the wavelengths of the input laser beams 204a-204d can be selected so that the diffracted optical energy from the input laser beams 204a-204d leaves the diffraction grating 214 in the same direction. In this way, the diffraction grating 214 combines most of the optical energy from all of the input laser beams 204a-204d to produce a combined beam having a higher power or energy than the input laser beams 204a-204d individually. In this example, the combined beam represents the HEL beam 106, although other implementations may produce other combined beams.

The diffraction grating 214 operates similarly with respect to the auto-alignment beam 208. The diffraction grating 214 diffracts the auto-alignment beam 208 so that part of the auto-alignment beam 208 (referred to as an auto-alignment beam 208a) co-propagates with the HEL beam 106 and at least one other part of the auto-alignment beam 208 (referred to as an auto-alignment beam 208b) does not. Again, the wavelength and direction of the auto-alignment beam 208 are selected or controlled so that the auto-alignment beam 208a diffracts from the diffraction grating 214 in the same direction as the HEL beam 106. In this way, the diffraction grating 214 allows the auto-alignment beam 208a to co-propagate with the combined beam (the HEL beam 106). Essentially, the various components 210-214 form a spectral beam combiner that combines optical energy at varying wavelengths to form a combined beam having a higher power or energy than the individual input beams with a co-propagating auto-alignment beam.

As can be seen here, the selection of the wavelength used for the auto-alignment beam 208 affects how the auto-alignment beam 208 diffracts from the diffraction grating 214. Thus, the wavelength used for the auto-alignment beam 208 can be selected for a particular implementation of the laser system 102 in order to provide the desired diffraction of the auto-alignment beam 208 from the diffraction grating 214 and proper co-propagation of the auto-alignment beam 208a with the HEL beam 106. In some embodiments, this is accomplished by identifying the wavelength of the auto-alignment beam 208 that is needed so that the second-order diffraction (or some other higher-order diffraction) of the auto-alignment beam 208 from the diffraction grating 214 co-propagates with the HEL beam 106. A higher-order diffraction represents a diffraction of the second-order or higher (whether positive or negative).

In particular embodiments, the auto-alignment beam 208 may have a wavelength that is roughly half the wavelengths of the input beams 204a-204d. While the input beams 204a-204d have different wavelengths, these wavelengths may typically be relatively close to one another. For example, the input laser beams 204a-204d may have different wavelengths that are all within a small range, such as within one or several nanometers of a nominal value of about 1050 nm (depending on the angles of the input laser beams 204a-204d on the diffraction grating 214). In these embodiments, the auto-alignment beam 208 may have a wavelength that is roughly half the wavelengths of the input laser beams 204a-204d, meaning around 525 nm. Note, however, that other wavelengths can be used here.

In some embodiments, the specific wavelength of the auto-alignment beam 208 can be calculated as one-half the wavelength that would have been used if the auto-alignment beam 208 represented another input laser beam being combined to produce the HEL beam 106. That is, assume the auto-alignment laser 206 is replaced by an additional input laser that generates an additional input laser beam, which is diffracted by the diffraction grating 214 for inclusion in the HEL beam 106. Based on the angle of arrival of the additional input laser beam at the diffraction grating 214, the additional input laser beam would require a specific wavelength in order to be diffracted in the same direction as the other input laser beams 204a-204d in order to form the HEL beam 106. Whatever that specific wavelength is, the auto-alignment beam 208 may have exactly one-half of that specific wavelength. This wavelength selection causes the second-order or other higher-order diffraction of the auto-alignment beam 208 from the diffraction grating 214 to co-propagate with the HEL beam 106. Thus, for instance, if the additional input laser beam in the position of the auto-alignment beam 208 needs a wavelength of 1050.66 nm to be diffracted properly in order to form part of the HEL beam 106, the auto-alignment beam 208 may have a wavelength of 525.33 nm. Note, however, that other wavelengths and angles may be used for the auto-alignment beam 208 (and/or for one, some, or all of the input beams 204a-204d) in order to achieve the desired co-propagation of the auto-alignment beam 208a with the HEL beam 106.

One or more beam dumps 216 may be used to terminate diffracted portions of the beams 204a-204d, 208 that are not used to form the HEL beam 106 or the auto-alignment beam 208a. Each beam dump 216 includes any suitable structure configured to absorb or otherwise terminate optical energy. In some embodiments, for example, each beam dump 216 represents an absorptive structure that absorbs optical energy at the desired wavelength(s) and that converts the optical energy into thermal energy, as well as a cooling system that removes the thermal energy to cool the absorptive structure. Beam dumps can come in a wide variety of configurations, and this disclosure is not limited to any particular type of beam dump. Note that since the directions of diffraction from the diffraction grating 214 depend on the wavelengths of the beams 204a-204d, 208, multiple beam dumps 216 may be used here in different directions from the diffraction grating 214, or a single large beam dump 216 may be sized and shaped to absorb all of the diffracted optical energy from the beams 204a-204d, 208 that is not being further used in the laser system 102.

Fold mirrors 218, 220, 222 are used to redirect the HEL beam 106 and the co-propagating auto-alignment beam 208a. Each fold mirror 218, 220, 222 includes any suitable reflective structure configured to reflect laser beams in a desired direction. The reflected beams 106, 208a are received at a fast steering mirror 224. The fast steering mirror 224 is configured to be controlled in order to alter how the beams 106, 208a reflect from the fast steering mirror 224. Depending on the implementation, the fast steering mirror 224 may be rotated or moved forwards or backwards as needed to control the reflection of the beams 106, 208a. The fast steering mirror 224 includes any suitable reflective structure configured to reflect laser beams in a controllable direction. The fast steering mirror 224 typically includes at least one servo for controlling how the laser beams are directed.

A beam splitter 226 reflects all or the bulk of the HEL beam 106 (and optionally part of the auto-alignment beam 208a) through an exit aperture 228. This allows at least the bulk of the HEL beam 106 to be transmitted in a desired direction, such as towards a target 104. Note that the HEL beam 106 that passes through the exit aperture 228 may be further processed if needed or desired before being transmitted towards a target 104 or other destination. For instance, the bulk of the HEL beam 106 passing through the exit aperture 228 may be provided to a telescope that is used to focus the HEL beam 106 on a target 104. The telescope may also be used to receive reflected optical energy from the target 104, and the reflected optical energy may be processed and imaged using one or more image sensors (such as a short-wave infrared or "SWIR" camera or other imaging device or devices). Of course, at least the bulk of the HEL beam 106 passing through the exit aperture 228 may be used in any other suitable manner and for any other suitable purpose.

The beam splitter 226 also transmits at least a portion of the auto-alignment beam 208a and optionally a small portion (usually a very small portion) of the HEL beam 106 to at least one sensor 230. The sensor 230 can process the received beam or beams to identify the position(s) of at least one of the auto-alignment beam 208a and the HEL beam 106, such as absolute positions on the sensor 230 or relative positions with respect to each other. The output of the sensor 230 may be used to perform various functions, such as adjustment of the fast steering mirror 224. Each sensor 230 includes any suitable structure configured to sense at least one optical beam, such as a Coude Optical Position Sensor (COPS) far-field sensor or other position sensitive detector (PSD).

In some embodiments, the laser system 102 includes at least one controller 232, which controls the overall operation of the laser system 102 and possibly a larger system into which the laser system 102 is integrated. For example, the controller 232 can control the operation of the lasers 202a-202d, 206 in order to control the generation of the beams 106, 208. The controller 232 can also process data from various sensors, such as the sensor 230, in order to alter one or more optical devices or other components in the laser system 102. As a particular example, the controller 232 can process measurements from the sensor 230 and possibly other sensors and adjust operation of the fast steering mirror 224 in order to help stabilize the HEL beam 106 on a target 104.

In some embodiments, the controller 232 includes at least one processor 234, at least one memory 236, and at least one communication interface 238. The at least one processor 234 may be configured to execute instructions stored in and obtained from at least one memory 236. The at least one processor 234 may include any suitable number(s) and type(s) of processing devices or other computing or control devices in any suitable arrangement. As specific examples, the at least one processor 234 may include one or more microprocessors, microcontrollers, digital signal processors (DSPs), field programmable gate arrays (FPGAs), application specific integrated circuits (ASICS), or discrete circuitry. The at least one memory 236 may include any suitable number(s) and type(s) of data storage and retrieval devices, such as random access memory, read only memory, Flash memory, a hard drive, an optical drive, or other memory. The at least one communication interface 238 may include any suitable number(s) and type(s) of interfaces allowing communication with other components of the laser system 102 or a larger system, such as one or more wired or wireless interfaces. Note that while shown and described as having a single controller 232, the laser system 102 may include multiple controllers that are used to control different aspects of the laser system 102.

As can be seen in the example shown in FIG. 2, the auto-alignment beam 208 follows the same optical path as the input beams 204a-204d and subsequently the HEL beam 106 from the fiber launcher 210 to the beam splitter 226. As a result, all of the optical components 212, 214, 218, 220, 222, 224, and 226) can be sampled using the auto-alignment beam 208, and there are no components here that can create relative motion between the auto-alignment beam 208 and the HEL beam 106 that is not sensed through the use of the auto-alignment beam 208. As a result, all thermally-induced motion, structurally-induced motion, or other motion of the optical components are identifiable using the auto-alignment beam 208, which can help to reduce or eliminate jitter error associated with unsampled optical elements in the path of the HEL beam 106.

Although FIG. 2 illustrates a portion of one example of a high-energy laser system 102 that includes a spectral beam combiner supporting an embedded auto-alignment scheme, various changes may be made to FIG. 2. For example, the makeup and arrangement of the laser system 102 shown in FIG. 2 are for illustration only. Components can be added, omitted, combined, further subdivided, replicated, or placed in any other suitable configuration according to particular needs. As a particular example, multiple auto-alignment lasers 206 may be used to generate multiple auto-alignment laser beams 208, and one, some, or all of the auto-alignment laser beams 208 may have suitable wavelengths so that their second-order or other higher-order diffractions from the diffraction grating 214 are co-boresighted with the HEL beam 106. As another particular example, the arrangement of a transform optic, various mirrors, a splitter, and other optical devices in FIG. 2 to process and route optical beams may be based on specific implementation needs, and other arrangements of optical devices may be used to process and direct optical beams in the desired manner. Also, the number(s) and type(s) of mirrors and other optical devices can vary based on the specific needs in a laser system. In general, this disclosure is not limited to any specific arrangement of mirrors and other optical devices.

Figure 3:
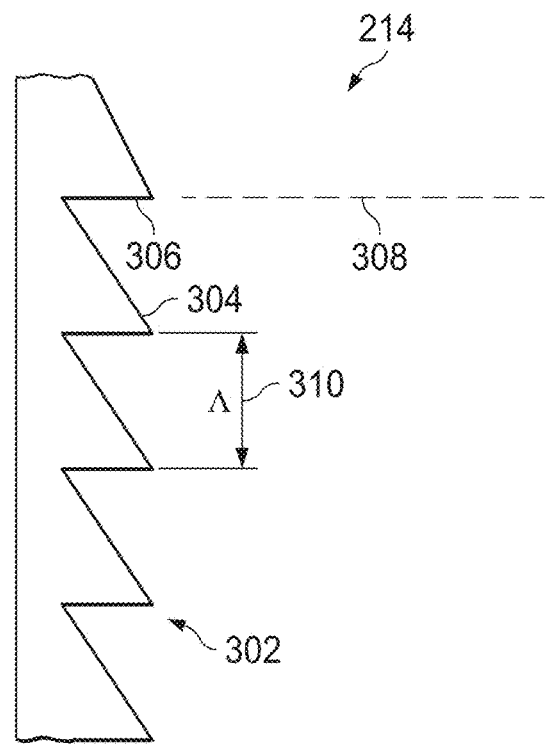
FIG. 3 illustrates an example diffraction grating for use in a spectral beam combiner supporting an embedded auto-alignment scheme according to this disclosure.

FIG. 3 illustrates an example diffraction grating 214 for use in a spectral beam combiner supporting an embedded auto-alignment scheme according to this disclosure. For ease of explanation, the diffraction grating 214 shown in FIG. 3 may be described as being used in the laser system 102 of FIG. 2 within the system 100 of FIG. 1 to engage a hostile target 104. However, the diffraction grating 214 of FIG. 3 may be used in any other suitable laser system designed in accordance with this disclosure that operates within any other suitable environment and for any other suitable purpose.

A diffraction grating 214 is generally defined as an optical surface or volume that produces a periodic modulation of an incident wavefront, typically through either index-of-refraction variations within the diffraction grating 214 or surface-relief variations on a surface of the diffraction grating 214. In the example shown in FIG. 3, a diffraction grating 214 includes a surface 302 having surface-relief variations that are periodic. In this particular example, the surface 302 has sawtooth surface-relief variations that are defined by angled surfaces 304 and surfaces 306 that are substantially parallel to a normal line 308 (which is perpendicular to the overall surface 302). It should be noted that this particular periodic surface structure is for illustration only and that other diffraction gratings can have other periodic surface-relief variations (or, as noted above, index-of-refraction variations). This disclosure is not limited to any specific type or implementation of diffraction grating 214. In this example, the surface features of the surface 302 have a period 310 (denoted A) that defines the regular distance between periodic features on the surface 302. In this example, the period is defined by the peaks of the periodic features, although the period can be defined as the distance between any common points of the surface features.

Figure 4:
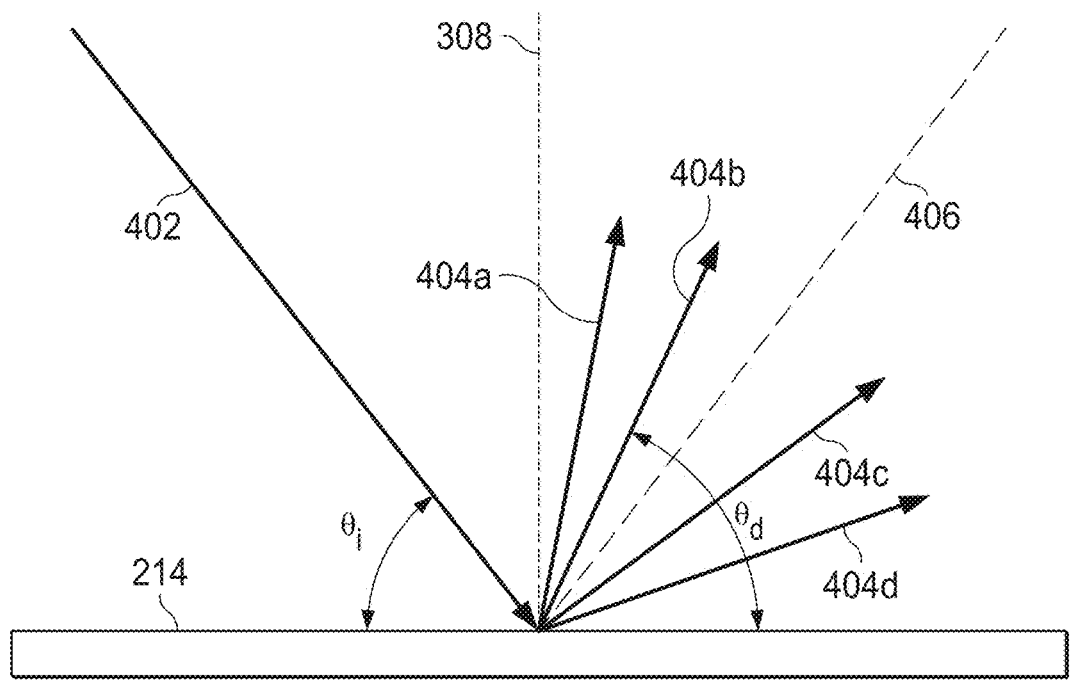
FIG. 4 illustrates an example operation of a diffraction grating in a spectral beam combiner supporting an embedded auto-alignment scheme according to this disclosure.

FIG. 4 illustrates an example operation of a diffraction grating 214 in a spectral beam combiner supporting an embedded auto-alignment scheme according to this disclosure. For ease of explanation, the diffraction grating 214 shown in FIG. 4 may be described as being used in the laser system 102 of FIG. 2 within the system 100 of FIG. 1 to engage a hostile target 104. However, the diffraction grating 214 of FIG. 4 may be used in any other suitable laser system designed in accordance with this disclosure that operates within any other suitable environment and for any other suitable purpose.

As shown in FIG. 4, an incoming optical beam 402 is received at the diffraction grating 214. The optical beam may, for example, represent any of the beams 204a-204d, 208 described above. The optical beam 402 is incident on the diffraction grating 214 at an angle that is denoted $\theta_i$. In this example, the optical beam 402 diffracts from the grating 214 into different diffracted beams 404a-404d. While four diffracted beams 404a-404d are shown here, there may be other numbers of diffracted beams generated here. The diffraction is due to the index-of-refraction variations within the diffraction grating 214 or the surface-relief variations on a surface of the diffraction grating 214, such as is shown in FIG. 3.

The diffraction grating 214 disperses the optical energy in the beam 402 through a combination of diffraction and interference. Here, each of the beams 404a-404d diffracts from the diffraction grating 214 at an angle that is denoted $\theta_d$, and the diffraction angle $\theta_d$ differs for each of the different diffraction beams 404a-404d. As noted above, a diffraction grating 214 may be transmissive rather than reflective as is shown in FIG. 4, although the same general principles apply to a transmissive diffraction grating.

In some embodiments, the beams 404a-404d represent different diffractions of the optical beam 402 from the diffraction grating 214, where the order of each diffraction of the optical beam 402 is denoted m. For example, the beam 404a may be said to represent the positive second-order diffraction of the beam 402, meaning m equals +2. The beam 404b may be said to represent the positive first-order diffraction of the beam 402, meaning m equals +1. The beam 404c may be said to represent the negative first-order diffraction of the beam 402, meaning m equals −1. The beam 404d may be said to represent the negative second-order diffraction of the beam 402, meaning m equals −2. A line 406 here represents the expected reflection angle of the beam 402 if the diffraction grating 214 had a completely reflective planar surface, and the positive and negative orders are positioned on opposite sides of the line 406. Although not shown here, additional diffraction beams may also be produced, such as when m equals ±3, ±4, and ±5.

The diffraction angle $\theta_d$ of each beam 404a-404d in FIG. 4 can be expressed as follows:

$$\sin \theta_d = \sin \theta_i + m\lambda/\Lambda \quad (1)$$

As seen in Equation (1), the diffraction angle of each beam 404a-404d is based on the incident angle $\theta_i$ of the optical beam 402 (meaning the direction or angle of arrival of the beam 402 at the diffraction grating 214), the order m of the diffraction beam, the wavelength $\lambda$ of the optical beam 402, and the period $\Lambda$ of the diffraction grating 214. This shows that the direction or angle of arrival and the wavelength of each of the input beams 204a-204d at the diffraction grating 214 can be selected in order to help ensure that the diffractions of the input beams 204a-204d from the diffraction grating 214 occur at the same diffraction angle $\theta_d$, thereby combining portions of the input beams 204a-204d to produce the HEL beam 106. For instance, the directions or angles of arrival and the wavelengths of the input beams 204a-204d can be selected so that their first-order diffractions all have the same diffraction angle $\theta_d$.

This also shows that, in some embodiments, an input beam used in place of the auto-alignment beam 208 (meaning an input beam having the same angle of arrival) may have a wavelength of $\lambda$, while the auto-alignment beam 208 may have a wavelength of $0.5\lambda$. Here, the first-order diffraction of the input beam and the second-order diffraction of the auto-alignment beam 208 would have an equal diffraction angle $\theta_d$ (since the order m for the input beam is 1 and its wavelength is $\lambda$, while the order m for the auto-alignment beam is 2 and its wavelength is $0.5\lambda$). Thus, in these embodiments, the auto-alignment beam 208 can have one-half the wavelength of an input laser beam at the same angle of arrival. In other embodiments, Equation (1) can be used to select other wavelengths and angles of arrival for the input laser beams 204a-204d and the auto-alignment beam 208 to ensure that diffractions of the beams 204a-204d, 208 have the same diffraction angle $\theta_d$.

Although FIG. 3 illustrates one example of a diffraction grating 214 and FIG. 4 illustrates one example of the operation of the diffraction grating 214 in a spectral beam combiner supporting an embedded auto-alignment scheme, various changes may be made to FIGS. 3 and 4. For example, other diffraction gratings 214 may be used in the laser system 102 in place of the diffraction grating 214 shown in FIG. 3. Also, the diffractions shown in FIG. 4 are examples only and can vary based on a number of factors, such as the incident angle $\theta_i$ and wavelength of the beam 402 and the design of the diffraction grating 214.

Figure 5:
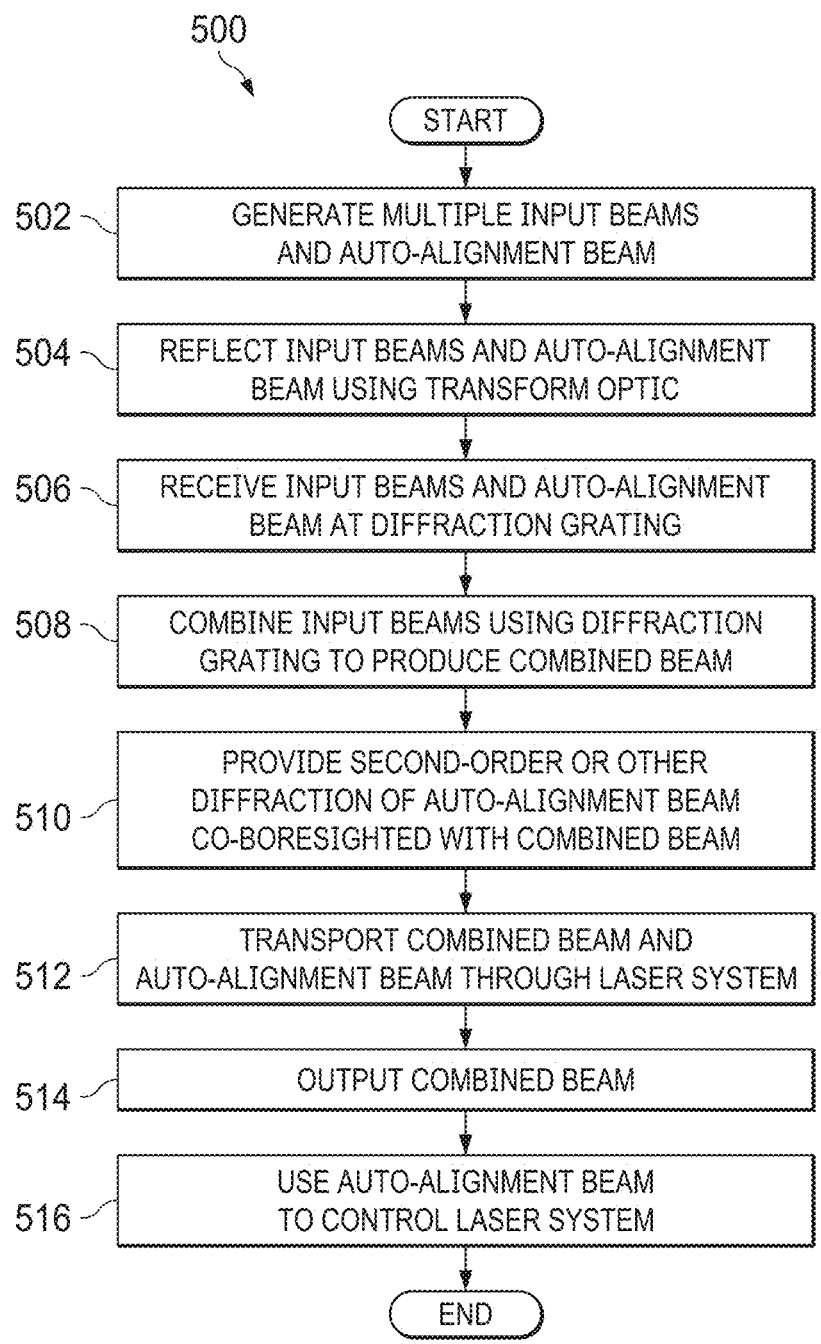
FIG. 5 illustrates an example method for using an embedded auto-alignment scheme in a spectral beam combiner according to this disclosure.

FIG. 5 illustrates an example method 500 for using an embedded auto-alignment scheme in a spectral beam combiner according to this disclosure. For ease of explanation, the method 500 shown in FIG. 5 may be described as involving the use of the laser system 102 of FIG. 2 in the system 100 of FIG. 1 to engage a hostile target 104. However, the method 500 of FIG. 5 may be used with any other suitable laser system designed in accordance with this disclosure that operates within any other suitable environment and for any other suitable purpose.

As shown in FIG. 5, multiple input beams and an auto-alignment beam are generated at step 502. This may include, for example, multiple input lasers 202a-202d producing multiple input laser beams 204a-204d and an auto-alignment laser 206 producing an auto-alignment laser beam 208. This may also include the lasers 202a-202d, 206 providing the beams 204a-204d, 208 to a fiber launcher 210. The input beams and the auto-alignment beam are reflected or otherwise processed using a transform optic at step 504, and the beams are received at a diffraction grating at step 506. This may include, for example, the fiber launcher 210 launching the beams 204a-204d, 208 towards a transform optic 212. This may also include the transform optic 212 focusing or otherwise processing the beams 204a-204d, 208 so that the beams 204a-204d, 208 are focused and directed at appropriate angles onto a diffraction grating 214.

The input beams are combined using the diffraction grating to produce a combined beam at step 508. This may include, for example, the diffraction grating 214 diffracting each of the input beams 204a-204d, where first-order diffractions of the beams 204a-204d diffract from the grating 214 at the same angle $\theta_d$. As shown in Equation (1) above, this can be accomplished by appropriate selection of the angles of arrival of the input beams 204a-204d at the diffraction grating 214 and/or the wavelengths of the input beams 204a-204d. Since the first-order diffractions of the beams 204a-204d diffract from the grating 214 at the same angle $\theta_d$, this results in the generation of a combined beam, such as an HEL beam 106, having a higher power or energy relative to the individual input beams 204a-204d. One or more other portions of the input beams 204a-204d may be terminated using one or more beam dumps 216.

A second-order diffraction or other diffraction of the auto-alignment beam that is co-boresighted to the combined beam is provided from the diffraction grating at step 510. This may include, for example, the diffraction grating 214 diffracting the auto-alignment beam 208 so that a second-order diffraction or other higher-order diffraction of the auto-alignment beam 208 diffracts from the grating 214 at the same angle $\theta_d$ as the input beams 202a-202d. As shown in Equation (1) above, this can be accomplished by appropriate selection of the angle of arrival of the auto-alignment beam 208 at the diffraction grating 214 and/or the wavelength of the auto-alignment beam 208. This results in the generation of an auto-alignment beam 208a that co-propagates with the HEL beam 106 or other combined beam. One or more other portions of the auto-alignment beam 208 (such as the auto-alignment beam 208b) may be terminated using one or more beam dumps 216.

The combined beam and the co-propagating auto-alignment beam are transported through a laser system at step 512. This may include, for example, various mirrors 218, 220, 222, 224 and a beam splitter 226 being used to redirect the HEL beam 106 or other combined beam and the co-propagating auto-alignment beam 208a as needed.

Most or all of the combined beam is output at step 514. This may include, for example, the beam splitter 226 providing the bulk or all of the HEL beam 106 through an exit aperture 228. The auto-alignment beam is used to control the laser system at step 516. This may include, for example, the beam splitter 226 providing at least part of the auto-alignment beam 208a (and possibly part of the HEL beam 106 or other combined beam) to at least one sensor 230. This may also include the sensor 230 sensing the location of the auto-alignment beam 208a, such as an absolute location or its location relative to the HEL beam 106 or other combined beam. This may further include the controller 232 controlling a fast steering mirror 224 or other optical device(s) to adjust the position of the auto-alignment beam 208a, which also adjusts the position of the HEL beam 106 or other combined beam.

Although FIG. 5 illustrates one example of a method 500 for using an embedded auto-alignment scheme in a spectral beam combiner, various changes may be made to FIG. 5. For example, while shown as a series of steps, various steps in FIG. 5 can overlap, occur in parallel, occur in a different order, or occur any number of times. Also, the use of optical devices such as transform optics, mirrors, beam combiners, and beam splitters can vary widely depending on the implementation.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 110(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 110(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an auto-alignment laser configured to generate an auto-alignment laser beam; and
   a spectral beam combiner comprising a diffraction grating that is configured to:
      diffract multiple input laser beams to produce a combined beam having a higher power or energy compared to the individual input laser beams; and
      diffract the auto-alignment laser beam so that a portion of the auto-alignment laser beam co-propagates in a common direction with the combined beam.

2. The apparatus of claim 1, wherein wavelengths of the input laser beams and the auto-alignment laser beam are selected such that portions of the input laser beams and the portion of the auto-alignment laser beam diffract from the diffraction grating in the common direction.

3. The apparatus of claim 2, wherein the common direction is dependent on (i) angles of arrival of the input laser beams and the auto-alignment laser beam at the diffraction grating and (ii) the wavelengths of the input laser beams and the auto-alignment laser beam.

4. The apparatus of claim 1, wherein the portion of the auto-alignment laser beam that co-propagates with the combined beam comprises a higher-order diffraction of the auto-alignment laser beam from the diffraction grating.

5. The apparatus of claim 4, wherein:
   the higher-order diffraction of the auto-alignment laser beam comprises a second-order diffraction of the auto-alignment laser beam;
   the input laser beams have wavelengths within a specified range of a nominal value; and
   the auto-alignment laser beam has a wavelength that is approximately half of the nominal value.

6. The apparatus of claim 1, wherein the auto-alignment laser beam follows a same optical path through a laser system as the input laser beams and the combined beam.

7. The apparatus of claim 1, wherein the auto-alignment laser and multiple input lasers that are configured to generate the input laser beams collectively form an embedded laser array.

8. A laser system comprising:
   an auto-alignment laser configured to generate an auto-alignment laser beam;
   a spectral beam combiner comprising a diffraction grating that is configured to:
      diffract multiple input laser beams to produce a high-energy laser (HEL) beam having a higher power or energy compared to the individual input laser beams; and
      diffract the auto-alignment laser beam so that a portion of the auto-alignment laser beam co-propagates in a common direction with the HEEL beam;
   a sensor configured to sense at least part of the portion of the auto-alignment laser beam that co-propagates with the HEL beam; and
   a controller configured to control at least part of the laser system based on measurements from the sensor.

9. The laser system of claim 8, wherein wavelengths of the input laser beams and the auto-alignment laser beam are selected such that portions of the input laser beams and the portion of the auto-alignment laser beam diffract from the diffraction grating in the common direction.

10. The laser system of claim 9, wherein the common direction is dependent on (i) angles of arrival of the input laser beams and the auto-alignment laser beam at the diffraction grating and (ii) the wavelengths of the input laser beams and the auto-alignment laser beam.

11. The laser system of claim 8, wherein the portion of the auto-alignment laser beam that co-propagates with the HEL beam comprises a higher-order diffraction of the auto-alignment laser beam from the diffraction grating.

12. The laser system of claim 11, wherein:
   the higher-order diffraction of the auto-alignment laser beam comprises a second-order diffraction of the auto-alignment laser beam;
   the input laser beams have wavelengths within a specified range of a nominal value; and
   the auto-alignment laser beam has a wavelength that is approximately half of the nominal value.

13. The laser system of claim 8, wherein the auto-alignment laser beam follows a same optical path through the laser system as the input laser beams and the HEL beam.

14. The laser system of claim 8, further comprising:
   multiple input lasers configured to generate the multiple input laser beams.

15. The laser system of claim 14, wherein the input lasers and the auto-alignment laser collectively form an embedded laser array.

16. The laser system of claim 8, wherein the sensor comprises at least one position sensitive detector configured to sense a location of the at least part of the portion of the auto-alignment laser beam and a location of part of the HEL beam.

17. The laser system of claim 16, wherein:
the laser system further comprises optics configured to direct the HEL beam, the optics including a fast steering mirror; and
the controller is configured to adjust the fast steering mirror based on the sensed locations.

18. A method comprising:
generating an auto-alignment laser beam;
diffracting multiple input laser beams using a diffraction grating to produce a combined beam having a higher power or energy compared to the individual input laser beams; and
diffracting the auto-alignment laser beam using the diffraction grating so that a portion of the auto-alignment laser beam co-propagates in a common direction with the combined beam.

19. The method of claim 18, wherein wavelengths of the input laser beams and the auto-alignment laser beam are selected such that portions of the input laser beams and the portion of the auto-alignment laser beam diffract from the diffraction grating in the common direction.

20. The method of claim 18, wherein the portion of the auto-alignment laser beam that co-propagates with the combined beam comprises a higher-order diffraction of the auto-alignment laser beam from the diffraction grating.

\* \* \* \* \*